(12) United States Patent
McKenney et al.

(10) Patent No.: US 7,734,881 B2
(45) Date of Patent: *Jun. 8, 2010

(54) ADAPTING RCU FOR REAL-TIME OPERATING SYSTEM USAGE

(75) Inventors: Paul E. McKenney, Beaverton, OR (US); Dipankar Sarma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/778,691

(22) Filed: Jul. 17, 2007

(65) Prior Publication Data

US 2007/0266209 A1 Nov. 15, 2007

Related U.S. Application Data

(63) Continuation of application No. 10/953,239, filed on Sep. 29, 2004, now Pat. No. 7,287,135.

(51) Int. Cl.
*G06F 12/00* (2006.01)

(52) U.S. Cl. ................ 711/159; 711/163; 711/E12.069

(58) Field of Classification Search ........................ None
See application file for complete search history.

(56) References Cited

U.S. PATENT DOCUMENTS

| 5,241,673 | A | 8/1993 | Schelvis |
| 5,442,758 | A | 8/1995 | Slingwine et al. |
| 5,608,893 | A | 3/1997 | Slingwine et al. |
| 5,727,209 | A | 3/1998 | Slingwine et al. |
| 6,219,690 | B1 | 4/2001 | Slingwine et al. |
| 6,675,379 | B1 * | 1/2004 | Kolodner et al. ............ 717/155 |
| 7,287,135 | B2 * | 10/2007 | McKenney et al. ......... 711/159 |

\* cited by examiner

*Primary Examiner*—Reginald G Bragdon
*Assistant Examiner*—Shawn X Gu
(74) *Attorney, Agent, or Firm*—Lieberman & Brandsdorfer, LLC

(57) ABSTRACT

A system and method is provided to support immediate freeing of a designated element from memory. Following a process of designating an element for removal from a data-structure, conditional limitations are used to determine if immediate freeing of the element from memory is available. The conditional limitations include determining that the instruction originates from a uniprocessor computer system. In addition, the conditional limitations include a determination as to whether a call_rcu primitive or synchronize_kernel primitive may be omitted, or whether the computer implemented instruction is operating in an interrupt handler. If the conditional limitations are met, the designated element may be immediately freed from memory.

16 Claims, 5 Drawing Sheets

ADAPTING RCU FOR REAL-TIME OPERATING SYSTEM USAGE

CROSS REFERENCE TO RELATED APPLICATION(S)

The present application is a continuation of U.S. patent application Ser. No. 10/953,239, filed Sep. 29, 2004, now issued as U.S. Pat. No. 7,287,135, and is hereby incorporated by reference.

BACKGROUND OF THE INVENTION

1. Technical Field

This invention relates to a system and method for providing real-time response in a read-copy-update (RCU) locking mechanism in a multiprocessor computer system.

2. Description of the Prior Art

Read-copy-update (RCU) is a mechanism that defers destruction of elements removed from a protected data structure, or a similar data organization element, until a concurrently executing read-only access to the data structure has completed an ongoing traversal of that data structure. The process for deferment of destruction of elements removed from the data structure permits lock free read-only access without incurring memory corruption and invalid pointer failures.

FIG. 1 is a prior art diagram (5) illustrating the RCU mechanism for removing an element from a data structure. In this example, element B (14) is being deleted from a data structure that contains elements A (10), B (14), and C (18), in that order. Initially, $Step_0$, the data structure is linked such that element A (10) includes a first pointer (12) to element B (14), and element B (14) includes a second pointer (16) to element C (18). The first step, $Step_1$, in removing element B (14) from the data structure using the RCU mechanism, is to move the first pointer (12) that originally extended from element A (10) to element B (12) to extend from element A (10) to element C (18). In FIG. 1, the movement of the first pointer (12) is shown as a third pointer (20). However, technically, the third pointer (20) is the same as the first pointer (12) but referencing a different element in the data structure. Pointers (12) and (20) cannot be present at the same time, however, readers currently referencing element C (18) may have arrived at element C (18) either using the old value (12) or the new value (20) of the pointer. Therefore, old value (12) and new value (20) represent different values for the same pointer. Any readers traversing this data structure concurrently with the deletion at $Step_1$ continue to be directed to either element B (14) or element C (18) in the data structure. Once a grace period has elapsed, there will not be any readers referencing element B (14) since the path provided in $Step_0$ by the first pointer (12) to element B (14) has been removed, as shown in $Step_2$. Following the grace period, element B (14) may now be freed from memory, as shown in $Step_3$. In this way, RCU defers freeing of elements removed from an RCU protected data structure until concurrently executing read actions have completed any ongoing traversals of that data structure.

The current implementation of the Linux 2.6 kernel provides two primitives that determine how long element B (14), from FIG. 1, must be retained in the data structure prior to removal therefrom. One of the primitives is known as synchronize_kernel, which cannot be called from an interrupt handler or within a spin lock. The synchronize_kernel primitive blocks a caller's subsequent execution by waiting until the end of a subsequent grace period, i.e. until current readers accessing data structure have completed that traversal. FIG. 2 is a flow chart (30) of a prior art use of this synchronize_kernel primitive showing removal of an element from a data structure and freeing the element from memory. The first step involves removal of an element from the data structure (32). Following removal of the element, the synchronize_kernel primitive is invoked in order to wait for one grace period to elapse (34). Once the grace period elapses (36), the synchronize_kernel primitive returns to its caller. This caller can then free (38) the element designated for removal from the data structure at step (32). Accordingly, the synchronize_kernel primitive is one mechanism for efficient access by readers to the data structure.

The second primitive provided by the Linux 2.6 kernel is the call_rcu primitive. This primitive supports efficient removal of an element from a data structure without requiring a context switch, wherein a context switch supports changing among concurrently operating processes in a multitasking environment. The call_rcu primitive registers the function that is freeing the element designated for removal from the data structure. FIG. 3 is a flow chart (40) of a prior art use of the call_rcu primitive for removal of an element from a data structure and freeing the element from memory. The first step involves removal of an element from the data structure (42). Following removal of the element at step (42), the element is then scheduled for removal from memory following a grace period through use of the call_rcu primitive (44). The call_rcu primitive places the element designated for removal from the data structure into a queue for removal at a later time (46). Following elapse of a grace period (48), the element in the queue is freed from memory (50). Accordingly, the call_rcu primitive is another mechanism for efficient removal of an element from a data structure and memory.

Current implementation of Linux 2.6 kernel has the effect of taking all of the elements scheduled to be removed during a specified period and executing removal of all of the elements at the end of a subsequent grace period. In addition, the implementation does not limit the number of elements that may be removed during a given grace period. By executing removal of a batch of designated elements at the end of a subsequent grace period, real-time performance associated with the removal is not provided as the current implementation imposes an arbitrary scheduling latency. Therefore, there is a need for modifying the implementation of both call_rcu and synchronize_kernel primitives in the Linux 2.6 kernel or equivalent module of an operating system to mitigate latency and provide real-time, i.e. immediate application for removal of designated elements from memory.

SUMMARY OF THE INVENTION

This invention comprises a method and system for mitigating RCU induced scheduling latency.

In one aspect of the invention, a method is provided for operating a single central processing unit (CPU) computer system in real-time. An RCU locked data structure is traversed by a first function without a second function access the data structure being made aware of the traversal. An element is removed from the data structure. Thereafter, a determination is made if the element can be immediately freed from memory. This determination includes a further determination as to whether the element can be removed from the data structure and freed from memory by the second function that is operating concurrently with the first function. If the conditional determination is positive, the element is immediately freed from memory.

In another aspect of the invention, a single central processing unit (CPU) computer system is provided with a first function adapted to traverse a read-copy-update (RCU) locked data structure without a second function being made aware of the traversal. An element is provided in the data structure, wherein the element is adapted to be removed from said data structure. In addition, a memory manager is provided to determine if the element can be immediately freed from memory. The memory manager also determines if the element can be removed from the data structure and freed from memory by the second function concurrently operating with the first function. A removal manager is provided to immediately free the element from memory in response to receipt of a positive determination from the memory manager.

In yet another aspect of the invention, an article is provided in a computer-readable medium with instructions configured to operate a single central processing unit (CPU) computer system. Instructions are provided to traverse a read-copy-update (RCU) locked data structure by a first function without other processes being made aware of the traversal. In addition, instructions are provided to remove an element from the data structure. It is determined if the element can be immediately freed from memory by another instruction, including instructions to determine if the element can be removed from the data structure and freed from memory by a second function concurrently operating in the data structure with the first function. In response to a positive determination, instructions are provided to immediately free the element from memory.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Both the call_rcu primitive and the synchronize_kernel primitive can be used to defer freeing a designated element from memory until elapse of a grace period. The use of the grace period guarantees that any concurrent readers of the data structure have released any reference to the designated element(s) that they might have had. However, use of the grace period can result in a large number of elements being freed from memory at one time in a non-immediate manner. This use of the grace period can degrade real-time response. By supplying alternative implementations of call_rcu and synchronize_kernel, immediate freeing of a designated element from memory may be achieved in limited circumstances, thereby limiting RCU-induced degradation of real-time response.

Technical Details

To alleviate the problem associated with maintaining real-time response with both the call_rcu and synchronize_kernel primitives, the grace period for freeing designated elements from memory may be removed in certain circumstances on single-CPU computer systems. The circumstances are as follows:

1. The first circumstance occurs when no function traversing the data structure calls another function, either directly or indirectly, that removes an element from the data structure.
2. The second circumstance occurs when no function traversing the data structure may be interrupted by an interrupt handler which removes an element from the data structure.

This first circumstance is widely observed since most computer code is based on non-RCU algorithms that cannot defer freeing of an element from memory. These two circumstances are met in any of the following situations:

1. All data structure-traversal and removal instructions are performed outside of an interrupt handler.
2. All data structure-traversal instructions run with interrupts disabled, regardless of whether it runs in process context or in an interrupt handler. Any interrupt handler that might remove an element from the data structure would be unable to run while the data structure is being traversed.
3. All data structure-traversal instructions run in an interrupt handler, and all instructions that might remove element from the data structure run only in process context, i.e. within a process.

Figure 3:
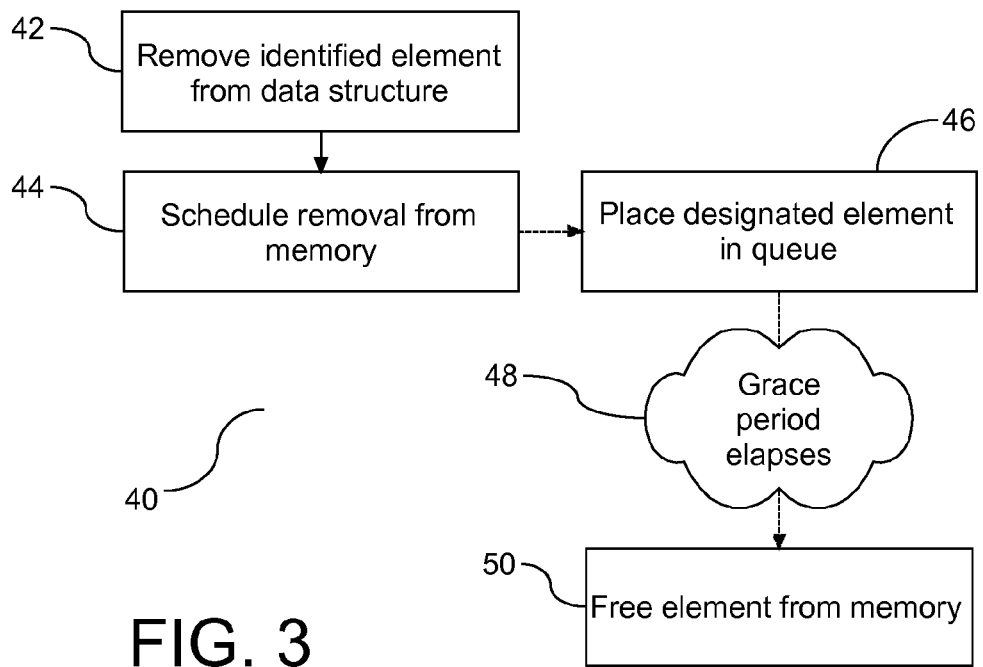
FIG. 3 is a flow chart of a prior art call_rcu primitive.
Figure 4:
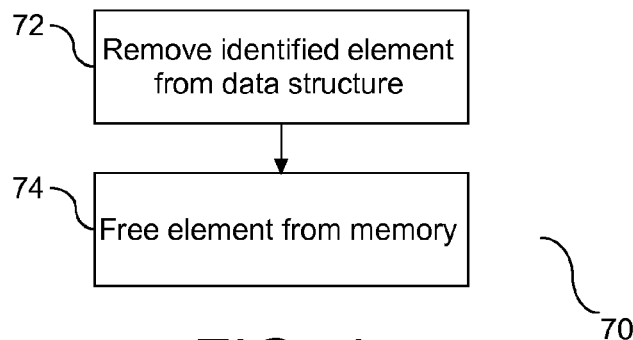
FIG. 4 is a flow chart illustrating real-time removal of a designated element from memory under a first situation according to the preferred embodiment of this invention, and is suggested for printing on the first page of the issued patent.

When any of the above data structure situations are met, a designated element may be immediately freed from memory. FIG. 4 is a flow chart (70) illustrating the process of removing an element from a data structure and freeing the element from memory without the use of a grace period in accordance with one embodiment of this invention when both constraints are met. As shown, the element is removed from the data structure (72), and then immediately freed from memory (74). As this scenario is only available in a uniprocessor system operating under both of the above identified circumstances, conditional compilation is used to distinguish between a uniprocessor and a multiprocessor situation. In a multiprocessor system, the process illustrated in FIG. 3 would apply.

Figure 5:
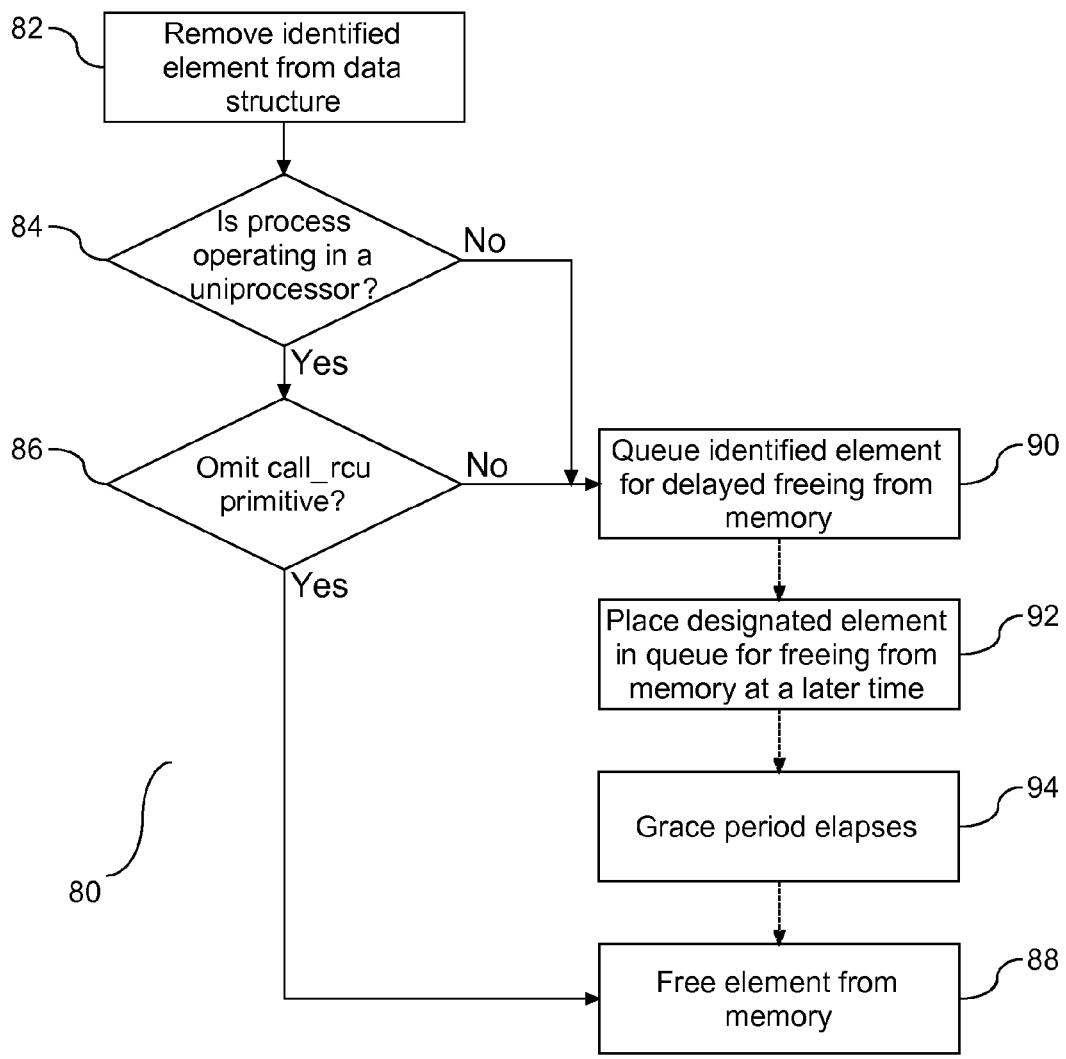
FIG. 5 is a flow chart illustrating real-time removal of a designated element from memory under a second situation.

FIG. 5 is a flow chart (80) illustrating a situation where the first circumstance mentioned above is violated. An identified element is removed from the data structure (82). Thereafter, a test is conducted to determine if this process is operating in a uniprocessor system (84). A positive response to the test at step (84) results in a subsequent test to determine if a flag has been set to enable omission of the call_rcu primitive (86). A positive response to the tests at steps (84) and (86) will enable the element identified at step (82) to be immediately freed from memory (88). However, a negative response to either the test at step (84) or the test at step (86) will result in invocation of the call_rcu primitive, which will queue the identified element for delayed freeing of the element from memory (90). In situations requiring delayed freeing, the call_rcu primitive places the element designated for removal from the data structure into a queue for freeing from memory at a later time (92). Following elapse of a grace period (94), the element in the queue is freed from memory (88). Accordingly, in a uniprocessor system where the first circumstance is violated a flag may be passed to the computer implemented instruction to determine if immediate freeing of the identified element from memory is possible.

Figure 1:
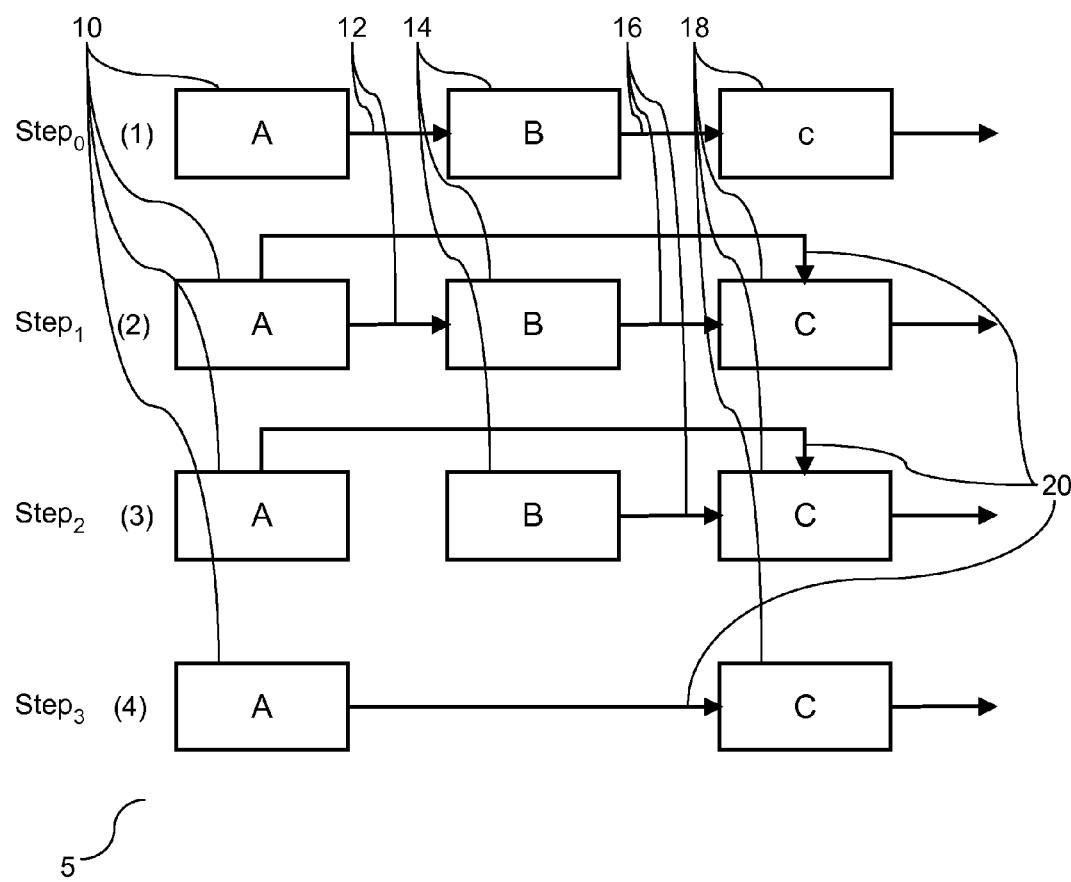
FIG. 1 is a block diagram of a prior art RCU operation.
Figure 2:
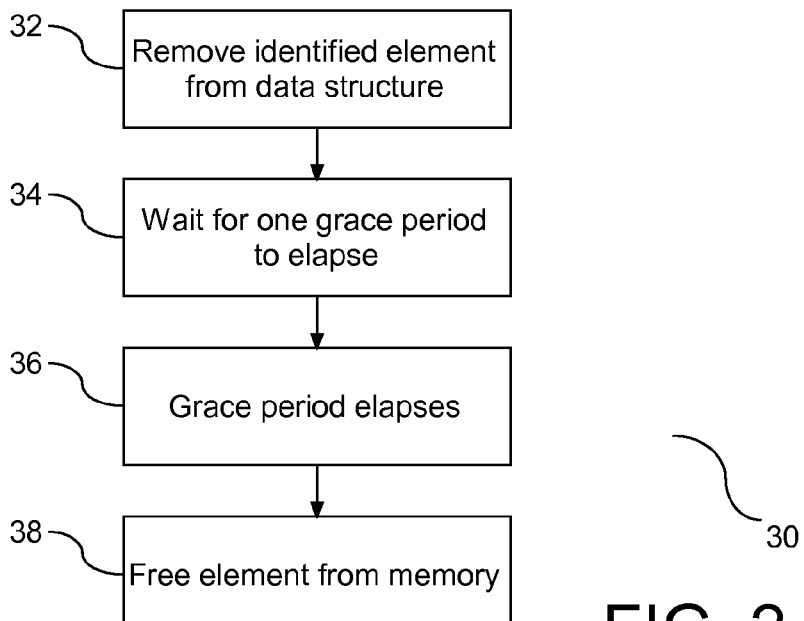
FIG. 2 is a flow chart of a prior art synchronize_kernel primitive.
Figure 6:
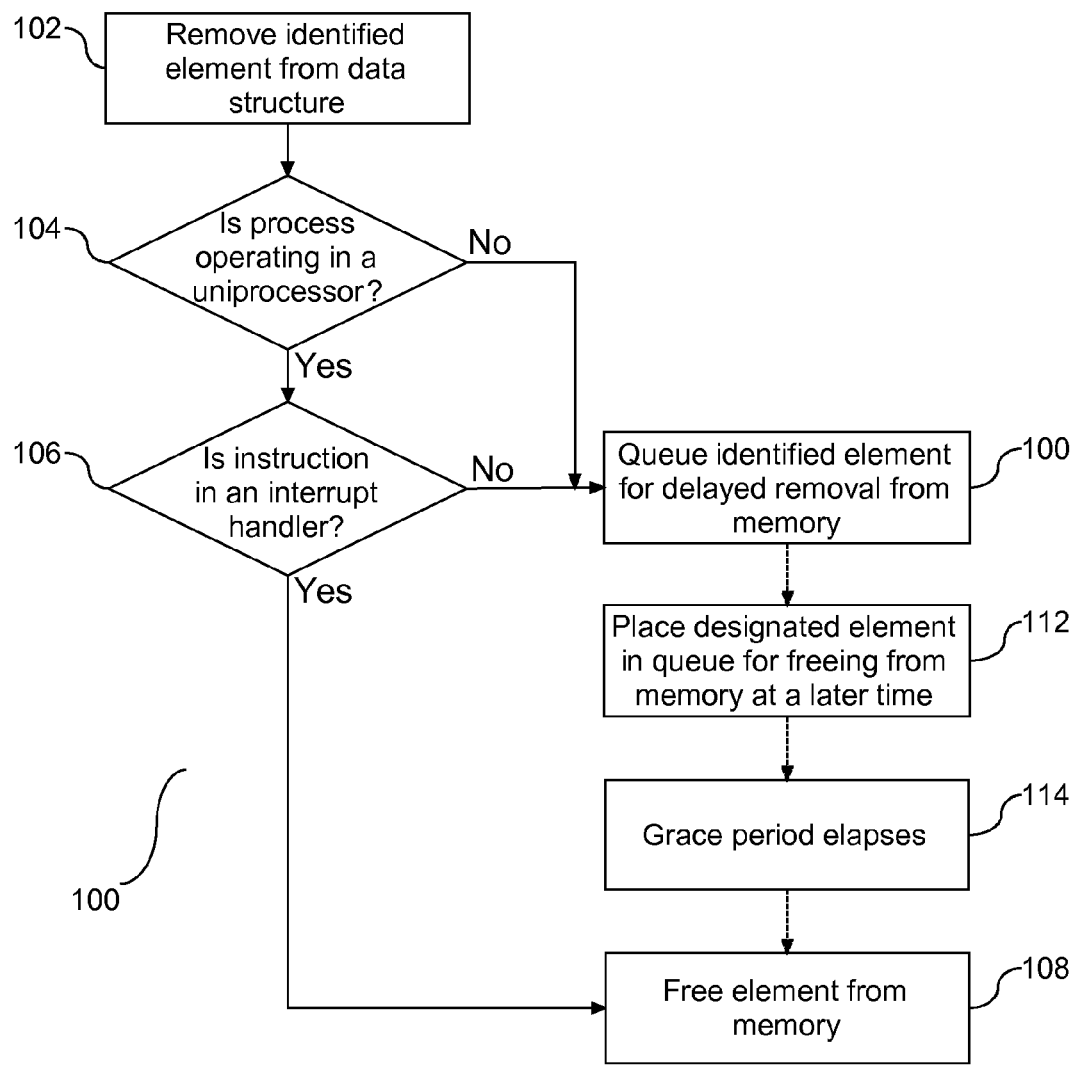
FIG. 6 is a flow chart illustrating real-time removal of a designated element from memory under a third situation.

FIG. 6 is a flow chart (100) illustrating a situation where the first circumstance mentioned above is observed, but the second circumstance is violated. An identified element is removed from the data structure (102). Thereafter, a test is conducted to determine if this process is operating in a uniprocessor system (104). A positive response to the test at step (104) results in a subsequent test to determine if the computer implemented instruction is operating in an interrupt handler (106). A positive response to the test at step (106) will enable the element identified at step (102) to be immediately freed from memory (108). However, a negative response to the tests at steps (104) or (106) will result in invocation of the call_rcu primitive (110) which will queue the identified element for delayed freeing of the element from memory. In situations requiring delayed freeing, the call_rcu primitive places the element designated for removal from the data structure into a queue for freeing from memory at a later time (112). Following elapse of a grace period (114), the element in the queue is freed from memory (108). The synchronize_kernel primitive, as shown in FIG. 2, may not be invoked within an interrupt handler and, as such, does not apply to the scenario illustrated herein. The operation uses a call_rcu primitive in an interrupt handler. The operation can detect if the primitive is operating within the interrupt handler to determine if the designated element can be immediately freed from memory. Accordingly, an element falling within the predetermined criteria that has not been identified for removal from an instruction operating within an interrupt handler may be immediately freed from memory.

Figure 7:
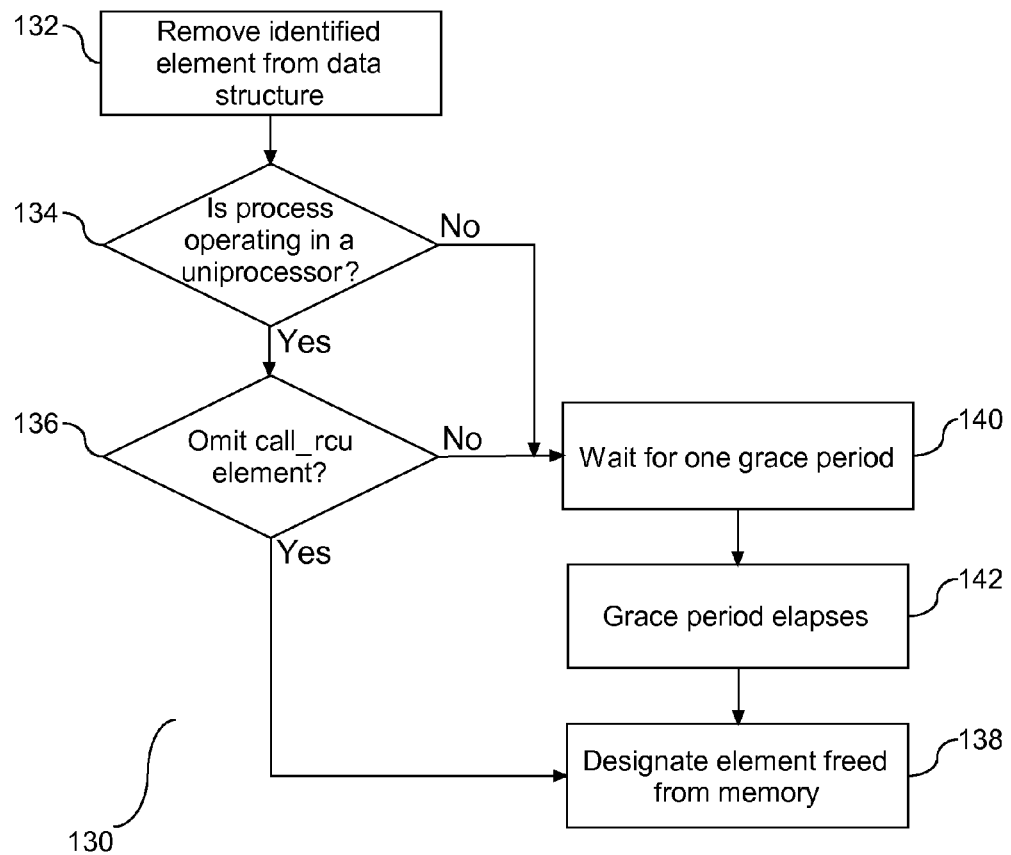
FIG. 7 is a flow chart illustrating real-time removal of a designated element from memory under a fourth situation.

Finally, FIG. 7 is a flow chart (130) illustrating a situation where both the first and second circumstances mentioned above are violated. An identified element is removed from the data structure (132). Thereafter, a test is conducted to determine if this process is operating in a uniprocessor system (134). A positive response to the test at step (134) results in a subsequent test to determine if a flag has been set to omit the call_rcu primitive (136). In one embodiment, the test at step (136) may be set to determine whether the calling function is being invoked from an interrupt handler. A positive response to the test at step (136) will enable the element identified at step (132) to be immediately freed from memory (138). However, a negative response to the test at step (136), or a negative response to the test at step (134), will result in invocation of the synchronize_kernel primitive (140) shown in FIG. 2, which will delay immediate freeing of the element from memory. Following elapse of a grace period (142), the designated element is freed from memory (138). Accordingly, in a situation where both the first and second circumstances are violated a flag is passed to the computer implemented instruction to determine whether the call_rcu primitive may be omitted in the process of freeing the selected element from memory.

Advantages over the Prior Art

A designated element may be immediately freed from a data structure under certain circumstances. Instructions are provided to determine if either the call_rcu or synchronize_kernel primitives must be implemented to support the circumstance in which the computer implemented instruction is operating. If neither of the primitives are required and it is determined that the computer implemented instruction is operating in a uniprocessor computer system, the element may be immediately freed from memory, thereby preventing the call_rcu or synchronize_kernel primitives from grouping all designated elements for removal into a single delayed execution event. Accordingly, the process of bypassing either of the primitives prevents the primitives from increasing scheduling latency.

Alternative Embodiments

It will be appreciated that, although specific embodiments of the invention have been described herein for purposes of illustration, various modifications may be made without departing from the spirit and scope of the invention. In particular, the element designated for removal may be in a data structure, a linked list, or a similar format for organizing data in a computer readable medium. Additionally, the process for removal of a designated element may be extended from application in Linux 2.6 kernel to zVM, DYNIX/ptx, and K42. The call_rcu and synchronize_kernel primitives are used for illustrative purposes only. Operating systems other than Linux have similar primitives or combinations of primitives that may be used to achieve substantially similar effects. For example, in DYNIX/ptx, the function performed by call_rcu is performed by a primitive named rc_callback, and the function performed by synchronize_kernel is performed by a combination of rc_callback, p_sema, and v_sema. Accordingly, the scope of protection of this invention is limited only by the following claims and their equivalents.

We claim:

1. A method for operating a single central processing unit (CPU) computer system comprising:
    traversing a read-copy-update (RCU) locked data structure by a first function without a second function accessing the data structure being made aware of said traversal;
    removing an element from said data structure;
    determining if said element can be immediately freed from memory, including determining if said element can be removed from said data structure and freed from memory by said second function operating concurrently with said first function; and
    immediately freeing said element from memory in response to a positive determination.

2. The method of claim 1, wherein the step of determining if said element can be immediately freed from memory includes determining if an interrupt handler can operate concurrently with said first function.

3. The method of claim 2, further comprising deferring freeing from memory of said element if said second function is operating in said interrupt handler and said interrupt handler is able to operate concurrently with said first function.

4. The method of claim 1, further comprising distinguishing between a uniprocessor and a multiprocessor computer system, and deferring freeing of said element in a uniprocessor computer system if said element can be removed from said data structure and freed from memory by said second function operating concurrently with said first function.

5. The method of claim 4, further comprising said second function passing a flag to said first function to determine immediate freeing of said element from memory in response to an ability of said second function concurrently operating in an interrupt handler to remove said element from said data structure and free said element from memory wherein said interrupt handler is unable to operate concurrently with said first function and remove said element from said traversed data structure.

6. A single central processing unit (CPU) computer system comprising:
- a first function adapted to traverse a read-copy-update (RCU) locked data structure without awareness by a second function accessing the data structure of said traversal;
- an element adapted to be removed from said data structure;
- a memory manager adapted to determine if said element can be immediately freed from memory and to determine if said element can be removed from said data structure and freed from memory by said second function adapted to operate concurrently with said first function; and
- a removal manager adapted to immediately free said element from memory in response to receipt of a positive determination from said memory manager.

7. The system of claim 6, wherein said memory manager is adapted to determine if an interrupt handler can operate concurrently with said first function.

8. The system of claim 7, further comprising a deferral manager adapted to delay immediate freeing of said element from memory if said second function is in said interrupt handler and said interrupt handler is able to operate concurrently with said first function.

9. The system of claim 6, further comprising a system manager adapted to defer freeing of said element in a uniprocessor computer system if said element can be removed from said data structure and freed from memory by said second function operating concurrently with said first function.

10. The system of claim 9, further comprising a flag adapted to be passed from said second function to said first function to determine immediate freeing of said element from memory in response to an ability of said second function concurrently operating in an interrupt handler to remove said element from said data structure and free said element from memory, wherein said interrupt handler is unable to operate concurrently with said first function and remove said element from said traversed data structure.

11. An article comprising: a computer-readable medium including computer program instructions configured to operate a single central processing unit (CPU) computer system, said instructions comprising: instructions to traverse a read-copy-update (RCU) locked data structure by a first function without awareness by some other processes of said traversal; instructions to remove an element from said data structure; instructions to determine if said element can be immediately freed from memory, including instructions to determine if said element can be removed from said data structure and freed from memory by a second function concurrently operating in said data structure with said first function; and instructions to immediately free said element from memory in response to a positive determination.

12. The article of claim 11, wherein said medium is a recordable data storage medium.

13. The article of claim 11, wherein said instructions to determine if said element can be immediately freed from memory includes instructions to determine if an interrupt handler can concurrently operate with said first function.

14. The article of claim 13, further comprising instructions to defer freeing of said element from said data structure in response to a determination of said second function operating within an interrupt handler and an ability of said interrupt handler to concurrently operate with said first function.

15. The article of claim 11, further comprising instructions to distinguish between a uniprocessor and a multiprocessor computer system, and instructions to defer freeing of said element in a uniprocessor computer system if said element can be removed from said data structure and freed from memory by a second function concurrently operating with said first function.

16. The article of claim 15, further comprising instructions for said second function to determine immediate freeing of said element from memory in response to an ability of said second function operating concurrently in an interrupt handler to remove said element from said data structure and free said element from memory, wherein said interrupt handler is unable to operate concurrently with said first function and remove said element from said traversed data structure.

* * * * *